Sept. 1, 1964     H. MENDELSON     3,147,056
PROTECTIVE INTERLOCK STRUCTURE
Filed June 27, 1962
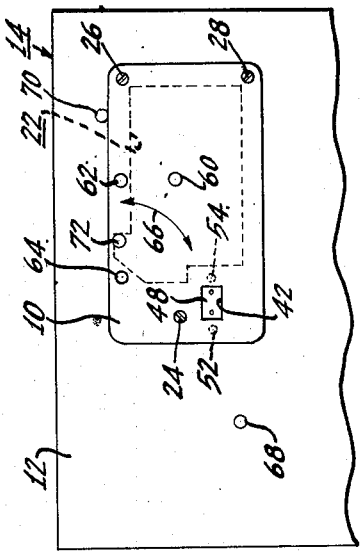
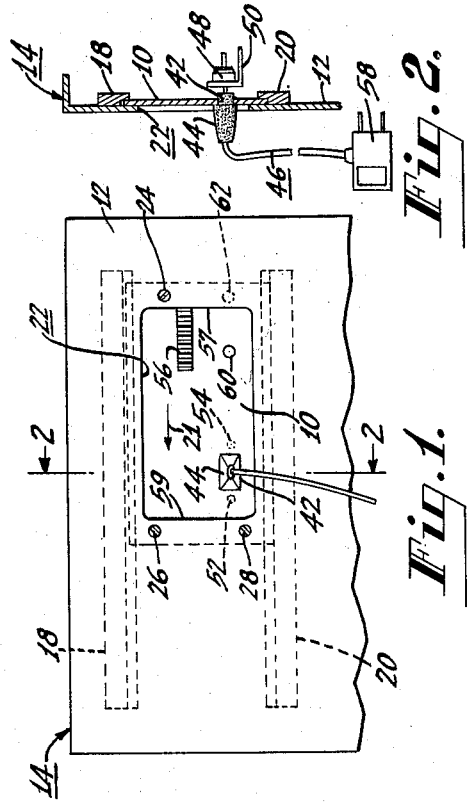
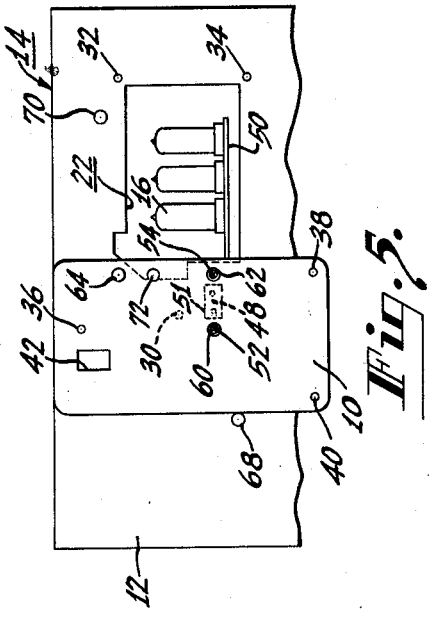
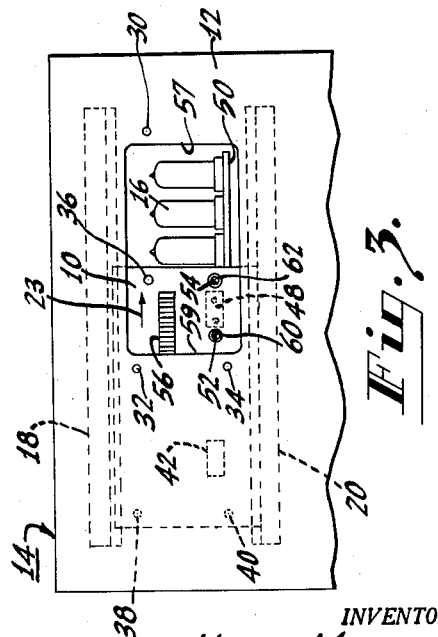
INVENTOR.
HANS MENDELSON
BY
ATTORNEY

United States Patent Office 3,147,056
Patented Sept. 1, 1964

3,147,056
PROTECTIVE INTERLOCK STRUCTURE
Hans Mendelson, Indianapolis, Ind., assignor to Radio Corporation of America, a corporation of Delaware
Filed June 27, 1962, Ser. No. 205,665
8 Claims. (Cl. 339—36)

This invention relates generally to protective interlock means, and particularly to an improved interlock structure adapted for use with electronic equipment. The improved interlock structure of the present invention is particularly useful in connection with radio receivers, television receivers, electronic amplifiers, and the like.

It has been proposed to provide protective interlock means for electronic equipment that utilizes voltages which are considered dangerous to human life. Many, prior art protective interlock structures, for example, make use of an electrical plug fixed to a removable cover of a cabinet for electronic equipment, the plug mating with a receptacle within the cabinet when the cover is secured to the cabinet. While this structure is satisfactory in many cases, in other cases, for example, where the cover is relatively large, it is sometimes possible to bend the cover away from the cabinet without disconnecting the plug from the receptacle, thereby providing access to "live" circuits within the cabinet. If the power cord is not permanently connected to the plug on the cover, the power cord may be inserted into the receptacle after the cover has been removed, thereby defeating the purpose of the protective interlock structure. Even when the power cord is permanently connected to the cover, a so-called "cheater" cord may be used to nullify the protective interlock structure after the cover has been removed.

It is an object of the present invention to provide an improved protective interlock structure that is relatively more foolproof than prior art protective interlock structures.

It is another object of the present invention to provide an improved protective interlock structure by means of which an electrical connector within a cabinet can receive a mating connector only when the cabinet is closed by a cover or panel.

Still another object of the present invention is to provide an improved protective interlock structure which will effectively guard against a power cord being connected to a mating connector within a cabinet when the equipment within the cabinet is exposed.

A further object of the present invention is to provide an improved protective interlock structure that is adapted to permit the removal of an electrical connector from a cabinet only when its mating connector is disconnected from the receptacle.

Still a further object of the present invention is to provide an improved protective interlock structure of the type described that is relatively simple in construction and operation, easy to manufacture, and highly safe in use.

Briefly, the improved protective interlock structure of the present invention comprises a panel mounted on the wall of a housing or cabinet for electrical equipment or the like. The panel is formed with one or more cut-outs and is mounted on the wall of the cabinet for movement over a predetermined path along the wall. In one position along its path of movement, the panel covers an opening in the wall and disposes one of the cut-outs in alignment with a first electrical connector member in the cabinet so that a mating electrical connector, as from a power cord, may be inserted through the cut-out for electrical connection with the first mentioned connector to operate the equipment. In other positions along its path of movement, the panel uncovers the opening in the wall of the cabinet and prevents the two connectors from being connected to each other. A connector on or behind the wall of the cabinet can be removed only when one or more cutouts in the panel are in alignment with the means that fix the connector with respect to the wall. In the latter position, the panel prevents the connector of the power cord from being connected to the mating connector in the cabinet.

The novel features of the present invention, both as to its organization and method of operation, as well as additional objects and advantages thereof, will be more readily understood from the following description, when read in connection with the accompanying drawing in which similar reference characters represent similar parts, and in which:

FIG. 1 is an elevational view of a portion of the wall of a cabinet for electrical equipment, showing one embodiment of the improved protective interlock structure with a power cord connected thereto in accordance with the present invention;

FIG. 2 is a cross-sectional view of the interlock structure taken along the line 2—2 in FIG. 1;

FIG. 3 is an elevational view of the interlock structure illustrated in FIG. 1, showing the interlock structure in a condition for exposing an opening in the wall of the cabinet;

FIG. 4 is an elevational view of the wall of a cabinet, showing another embodiment of the improved, protective interlock structure of the present invention; and FIG. 5 is an elevational view of the interlock structure illustrated in FIG. 4, showing the interlock structure in a condition for exposing an opening in the wall of the cabinet.

Referring, now, to FIGS. 1, 2, and 3, there is shown an improved protective interlock structure wherein a panel 10 is mounted on the wall 12 of a cabinet 14 for housing electrical equipment or the like. The wall 12 may be the rear wall of the cabinet 14, and the cabinet 14 may house electrical components, such as radio tubes 16, that require occasional servicing.

The panel 10 is mounted on the wall 12 for movement in a predetermined path along the wall 12. To this end, a pair of upper and lower channel bars, or guide rails 18 and 20, respectively, are fixed to the wall 12 by any suitable means, as by welding, for example. The panel 10 is disposed between the guide rails 18 and 20 and is adapted to be moved along a path whose directions are indicated by the arrows 21 (FIG. 1) and 23 (FIG. 2). In one position along the path of movement, the panel 10 covers an opening 22 in the wall 12. In this position, the panel 10 can be secured to the wall 12 by means of screws 24, 26, and 28 that pass through holes 30, 32, and 34 in the wall 12 and engage with threaded holes 36, 38, and 40 in the panel 10, respectively.

The panel 10 is formed with a cut-out 42 through which one of a pair of mating electrical connectors, such as a female receptacle 44 of a removable power cord 46, may be inserted for engagement with the other connector member, or male mating plug 48 within the cabinet 14, as shown in FIGS. 1 and 2. The plug 48 may be fixed to a chassis 50 within the cabinet 14 by fastening means, such as screws 52 and 54. Stop means, in the form of a raised grip 56, may be formed in the panel 10 to limit the path of movement of the panel 10 with respect to the wall 12. When the panel 10 is at the extreme right position of the panel, and covers the opening 22 in the wall 12, one end of the grip 56 abuts against an edge 57 of the wall 12 that defines the opening 22, as shown in FIG. 1. When the panel 10 is moved to the extreme left position to expose the opening 22, as shown in FIG. 3, the other end of the grip 56 abuts an opposite edge 59 of the wall 12 that defines the opening 22.

In order to operate the equipment within the cabinet 14, electric power is supplied to it by means of the power cord 46. A male plug 58 on one end of the power cord 46 is connected to any suitable source (not shown) of electrical energy, and the female receptacle 44 of the power cord 46 is connected with the mating plug 48 by inserting the receptacle 44 through the cut-out 42 in the panel 10. It will be noted that, when the receptacle 44 is connected with the mating plug 48, the panel 10 must be in a position that covers the opening 22 in the wall 12, thereby preventing any access to dangerous equipment within the cabinet 14.

If it is desired to service the equipment within the cabinet 14, as, for example, to replace one of the tubes 16, the screws 24, 26, and 28 are removed, and the panel 10 is moved in the direction of the arrow 21 to expose the opening 22. It is noted that the receptacle 44 must also be disengaged from the mating plug 48 before the panel 10 can be moved to expose the equipment within the cabinet 14, as shown in FIG. 3. When the equipment is exposed, the cut-out 42 in panel 10 is misaligned with the plug 48, but the panel covers the plug, making it impossible for the receptacle 44 to be connected with the plug 48. After servicing the equipment within the cabinet 14, the panel 10 can be moved over to the right to cover the opening 22, the cut-out 42 then being aligned with the plug 48, as shown in FIGS. 1 and 2.

The panel 10 may be formed with one or more cut-outs 60 and 62 in order to facilitate the removal of the plug 48 from the chassis 50 by a skilled technician. When the opening 22 is exposed by removing the panel 10 therefrom, the cut-outs 60 and 62 can be aligned with the screws 52 and 54, respectively, so that the latter may be removed by means of a special screw driver, or keyed device, for example, that can be inserted through the openings 60 and 62. A skilled technician may now connect the receptacle 44 of the power cord 46 to the loosened plug 48 through the opening 22 for servicing purposes. It is noted, however, that this procedure would not be available ordinarily to people other than skilled personnel equipped with the proper tools.

Referring, now, to FIGS. 4 and 5 there is shown another embodiment of the improved protective interlock structure of the present invention wherein the panel 10 is pivotally mounted to the wall 12 by means of a pivot pin 64. The ends of the pivot pin 64 are flared to hold the panel 10 loosely so that the panel 10 can be rotated over the wall 12 along a path of movement whose direction is indicated by the double-headed arrow 66. Stop means in the form of pins 68 and 70, extending outwardly from the wall 12, may be used to limit the path over which the panel 10 can be moved. Alternatively, a stop pin 72 fixed to the panel 10 and extending inwardly into the interior of the cabinet 14 may also be used to limit the path over which the panel 10 may be moved. In the latter case, the stop pin 72 is adapted to abut against portions of the wall 12 that define the opening 22, as shown in FIGS. 4 and 5. The plug 48, in FIGS. 4 and 5, is secured to the wall 12 by fastening means, such as screws 52 and 54, and is accessible through both an opening 51 in the wall 12 and the cut-out 42 in the panel 10.

The operation of the improved protective interlock structure illustrated in FIGS. 4 and 5 will now be explained: In order to operate the equipment within the cabinet 14, the receptacle 44 of the power cord 46 is inserted through the cut-out 42 and in engagement with the mating plug 48. The panel 10 must cover the opening 22, as shown in FIG. 4, for the cut-out 42 to be in alignment with the plug 48. In this position of the panel 10, no access is provided to the dangerous equipment within the cabinet 14, and the equipment is in an operable condition. The receptacle 44 may now be connected to the plug 48 through the cut-out 42 and the opening 51.

If it is desired to service or to inspect the equipment within the cabinet 14, the screws 24, 26 and 28 are removed, and the panel is rotated about the pivot pin 64, that is, moved along the wall 12, until the equipment within the cabinet is fully exposed through the opening 22, as shown in FIG. 5. Before the panel 10 may be moved, however, the receptacle 44 must be disconnected from the mating plug 48. With the panel 10 in any position except that shown in FIG. 4, the cut-out 42 is misaligned with the plug 48 so that it is impossible to connect the receptacle 44 to the plug 48. With the panel 10 in the position shown in FIG. 5, that is, with the opening 22 in the wall 12 exposing the equipment within the cabinet 14 to view, the cut-outs 60 and 62 may be aligned with the screws 52 and 54, respectively. In this position of the panel 10, a proper tool may be inserted through the cut-outs 60 and 62 to remove the screws 52 and 54, thus freeing the plug 48 from its fixed position on the wall 12. Since the latter operation preferably requires a special tool, it would most likely be performed by a technician familiar with the equipment who has such a tool.

From the foregoing description, it will be apparent that there has been provided an improved protective interlock structure whereby electrical equipment may be plugged in for operation only when access to dangerous parts of the equipment is completely blocked. While only two embodiments of the present invention have been described, various components useful therein, as well as variations in the equipment itself, all coming within the spirit of this invention, will, no doubt, readily suggest themselves to those skilled in the art. Hence, it is desired that the foregoing shall be considered merely as illustrative and not in a limiting sense.

What is claimed is:

1. Protective interlock means for equipment having an electrical connector member within an enclosure, said enclosure comprising a wall formed with an opening therein to provide access to said equipment, said connector member being accessible through said wall, said interlock means comprising
    (a) a panel formed with a cut-out therein,
    (b) means cooperatively associated with said panel and said wall enabling said panel to be moved over a predetermined path along said wall, said path being substantially parallel to said wall, and
    (c) stop means cooperatively associated with said panel and said wall to limit the movement of said panel between opposite ends of said path, said panel covering said opening and disposing said cut-out in alignment with said connector member when said panel is adjacent to one of said ends of said path, whereby a mating connector member may be inserted through said cut-out for connection with said first named connector member, said panel exposing said opening and disposing said cut-out in misalignment with said first named connector member to prevent said mating connector member from being connected to said first named connector member when said panel is adjacent to the other of said ends of said path, and said cut-out being only large enough to receive said mating connector member therein, whereby to prevent said panel from substantial movement with respect to said wall when said connector members are connected to each other.

2. A protective interlock structure for equipment employing an electrical connector member within an enclosure bounded by a wall formed with an opening therein, said connector member being accessible through said wall, and means engaging said connector member to position it with respect to said wall, said structure comprising
    (a) a panel formed with a cut-out and at least one hole therein,
    (b) means cooperatively associated with said panel and said wall enabling said panel to be moved over a predetermined path along said wall,
    (c) means to secure said panel to said wall when said panel is in one position along said path so as to cover said opening when said cut-out is in alignment with said connector member, whereby a mating connector member may be inserted through said cut-out for connection with said first named connector member, said panel exposing said opening and misaligning said cut-out with said first named connector member so as to prevent said mating connector member from being connected with said first named connector member when said panel is in any position along said path other than said one position, and (d) said hole being in alignment with said means for engaging said first named connector member only when said panel is in a predetermined position along said path other than in said one position, whereby said first named connector member may be removed.

3. A protective interlock structure for electrical equipment employing an electrical connector member within an enclosure, said enclosure comprising a wall formed with an opening therein to provide access to said equipment, said connector member being accessible through said wall, said structure comprising (a) a panel formed with a cut-out therein, (b) guide rails fixed to said wall to engage and to guide said panel for movement over a predetermined path along said wall, said path being substantially parallel to said wall, said panel covering said opening and said cut-out being aligned with said connector member when said panel is in one position along said path, whereby a mating connector member may be inserted through said cut-out for connection with said first named connector member, and said panel exposing at least a portion of said opening and preventing said mating connector member from being connected with said first named connector member when said panel is in positions along said path other than in said one position, and (c) stop means fixed to said panel and cooperating with portions of said wall defining said opening to limit the amount of movement of said panel along said path.

4. Protective interlock means for equipment having an electrical connector member within an enclosure, said enclosure comprising a wall formed with an opening therein to provide access to said equipment, said connector member being accessible from the exterior of said enclosure, said interlock means comprising (a) a panel formed with a cut-out therein, and (b) means pivotally mounting said panel on said wall to enable said panel to swing over a predetermined path along said wall, said path being substantially parallel to said wall, said panel covering said opening and said cut-out being aligned with said connector member when said panel is in one position in said path, whereby a mating connector member may be inserted through said cut-out for connection with said first named connector member, and said panel exposing at least a portion of said opening and misaligning said cut-out with respect to said first named connector member to prevent said mating connector member from being connected with said first named connector member when said panel is in positions along said path other than in said one position.

5. In combination, (a) a wall for an enclosure, said wall being formed with an opening providing access to said enclosure, (b) a first electrical connector member, (c) means securing said connector member with respect to said wall, (d) a panel formed with a plurality of cut-outs therein, and (e) means cooperatively associated with said panel and said wall enabling said panel to move over a predetermined path with respect to said wall; said panel, in one position along said path, covering said opening and disposing one of said cut-outs in alignment with said first connector member, whereby a mating connector member may be inserted through said one cut-out for connection with said first connector member; and said panel, in another position along said path (1) exposing said opening, (2) misaligning said one cut-out with said first connector member to prevent access of said mating connector member to said first connector member, and (3) disposing another of said cut-outs in alignment with said securing means, whereby a tool may be inserted through said another cut-out to disconnect said first connector member.

6. In combination, (a) a wall for an enclosure, said wall being formed with an opening permitting access to equipment within said enclosure, (b) a first electrical connector member, (c) means securing said connector member to said equipment, (d) a panel formed with a plurality of cut-outs therein, and (e) means mounting said panel to said wall to enable said panel to move over a predetermined path with respect to said wall, said panel in one position along said path covering said opening and disposing one of said cut-outs in alignment with said connector member, whereby a mating connector member may be inserted through said one cut-out for connection with said first connector member, and said panel in another position along said path (1) exposing said opening, (2) misaligning said one cut-out with said first connector member to prevent access of said mating connector member to said first connector member, and (3) disposing at least another of said cut-outs in alignment with said securing means, whereby to provide access to said securing means for removal thereof.

7. In combination, (a) a wall for an enclosure, said wall being formed with an opening permitting access to equipment within said enclosure, (b) a first electrical connector member, (c) means securing said connector member to said wall to provide access to said connector member from the exterior of said enclosure, (d) a panel formed with a plurality of cut-outs therein, and (e) means pivotally mounting said panel on said wall to enable said panel to swing over a predetermined path with respect to said wall, said panel in one position along said path covering said opening and disposing one of said cut-outs in alignment with said connector member, whereby a mating connector member may be inserted through said panel for connection with said first connector member, and said panel in another position along said path (1) exposing said opening, (2) misaligning said one cut-out with said first connector member to prevent access of said mating connector member to said first connector member, and (3) disposing other of said cut-outs in alignment with said securing means to provide access to said securing means for removal thereof.

8. In combination, (a) a wall for an enclosure, said wall being formed with an opening permitting access to equipment within said enclosure, (b) a first electrical connector member, (c) means securing said connector member to said equipment for access from the exterior of said enclosure, (d) a panel formed with a plurality of cut-outs therein, and (e) means mounting said panel to said wall to enable said panel to slide over a predetermined path with respect to said wall, said panel in one position along said path covering said opening and disposing one of said cut-outs in alignment with said connector member, whereby a mating connector member may be inserted through said one cut-out for connection with said first connector member, and said panel in another position along said path (1) exposing said opening, (2) preventing access of said mating connector member with said first connector member, and (3) disposing other of said cut-outs in alignment with said securing means, whereby to provide access to said securing means for removal of said first connector member from said wall.

References Cited in the file of this patent

UNITED STATES PATENTS

| | | |
|---|---|---|
| 2,820,842 | Meistrell | Jan. 21, 1958 |
| 2,874,205 | Race | Feb. 17, 1959 |
| 2,938,188 | Lazzery | May 24, 1960 |

FOREIGN PATENTS

| | | |
|---|---|---|
| 611,560 | Germany | Mar. 29, 1935 |
| 614,730 | Germany | June 15, 1935 |
| 434,807 | Great Britain | Sept. 2, 1935 |